(12) United States Patent
Orii

(10) Patent No.: US 6,459,315 B2
(45) Date of Patent: Oct. 1, 2002

(54) WAVE REFORMING CIRCUIT

(75) Inventor: Toshihiko Orii, Kanagawa (JP)

(73) Assignee: Sony Corporation (JP)

( * ) Notice: Subject to any disclaimer, the term of this patent is extended or adjusted under 35 U.S.C. 154(b) by 28 days.

(21) Appl. No.: 09/789,558

(22) Filed: Feb. 22, 2001

(30) Foreign Application Priority Data

Feb. 24, 2000 (JP) ....................... 2000-052284

(51) Int. Cl.[7] .............................. H03K 3/017

(52) U.S. Cl. .................. 327/172; 327/100; 327/345

(58) Field of Search ................... 327/100, 134, 327/137, 165, 172–174, 336, 339, 344, 345

(56) References Cited

U.S. PATENT DOCUMENTS 4,577,154 A * 3/1986 Takagi et al. ............... 327/172

* cited by examiner

Primary Examiner—Kenneth B. Wells
(74) Attorney, Agent, or Firm—Rader, Fishman & Grauer PLLC; Ronald P. Kananen, Esq.

(57) ABSTRACT

A wave reforming circuit for correcting the upward and downward asymmetry of and binary coding a data train signal modulated by EFM modulation or another modulation method giving a substantially equal rate of occurrence of "1" and "0", which can output to a comparator outputting binary data a binary signal holding a predetermined temporal mean value regardless of fluctuation in the temporal mean value of the input signal and having superior symmetry compared with the related art using as a reference value three types of reference voltages (0 level, positive side, and negative side) generated by inputting an integrated value of the output of the comparator into a charge pump.

10 Claims, 6 Drawing Sheets

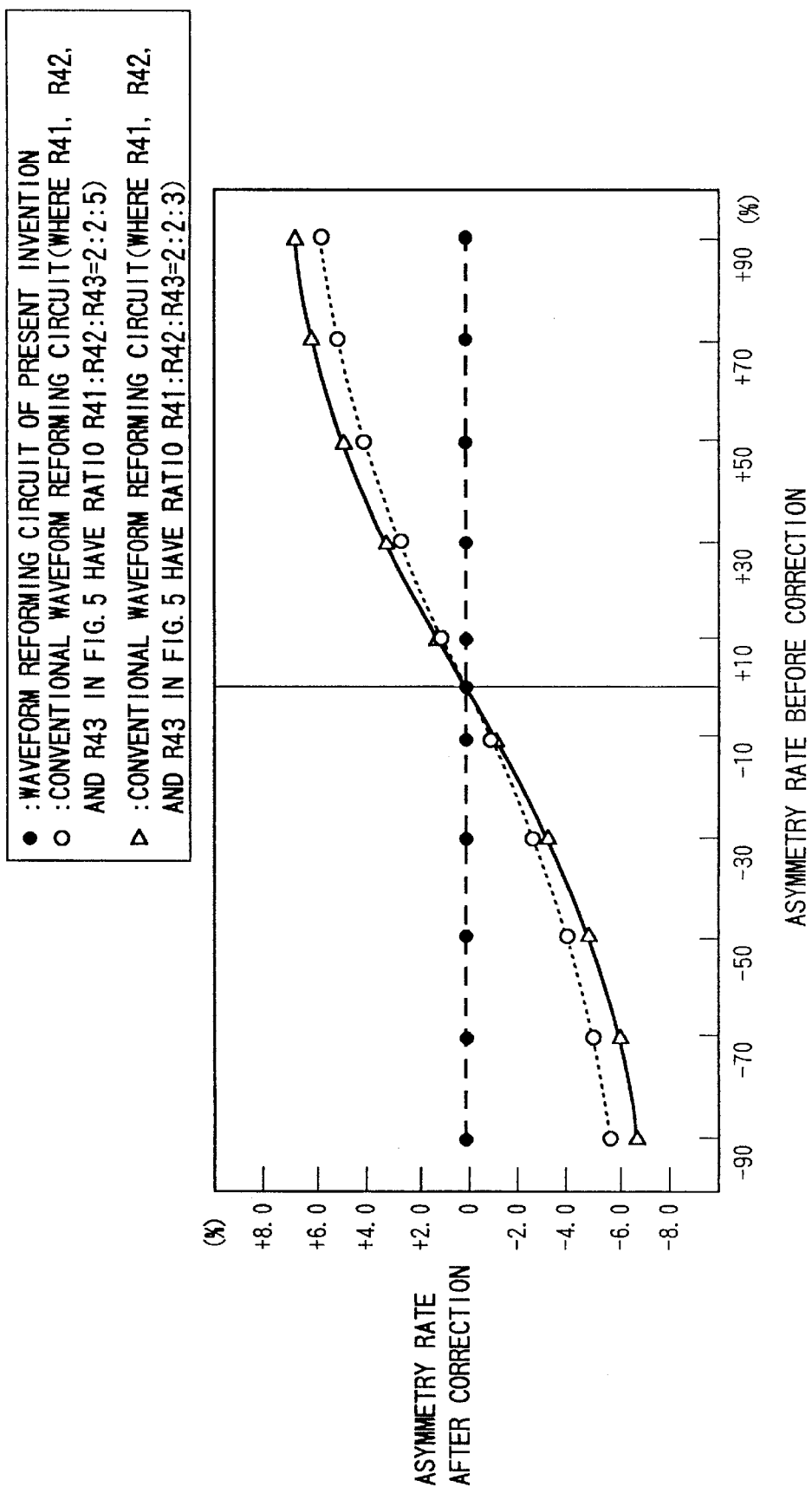

WAVE REFORMING CIRCUIT

BACKGROUND OF THE INVENTION

FIELD OF THE INVENTION

The present invention relates to a waveform reforming circuit for reforming a waveform of an input signal, more particularly relates to a waveform reforming circuit for reforming a signal read from a recording medium etc. with a temporal mean value fluctuating relative with respect to a predetermined value due to an external disturbance component to a binary signal having the predetermined temporal mean value.

The recording medium known as an optical disc is constituted by a transparent plastic substrate having laterally long holes in a circumferential direction referred to as "pits" formed corresponding to the signal, a thin metal film deposited thereon, and a hard resin layer for protecting the thin metal film.

The information recorded on the optical disc is read from the recording medium by focusing light such as a laser beam to the surface of the transparent plastic substrate and converting the light reflected by the thin metal film to an electric signal by an opto-electric conversion element. Namely, at the spot on the circumference of the optical disc on which the light is focused, the intensity of the light reflected from the thin metal film changes between a case where there is a pit and a case where there is no pit, therefore the information recorded based by the pit on the optical disc is converted to a strong or weak electric signal by detecting the intensity of the reflected light by the opto-electric conversion element.

The information recorded on the optical disc by the pit is recorded by a modulation method referred to as eight-to-fourteen modulation (EFM modulation or 8–14 modulation). According to this EFM modulation, what had been an 8-bit code before modulation is converted to a 14-bit code based on an EFM modulation table. The conversion table is selected so that a pulse width of a pulse train resulting from the created code becomes 3T to 11T where one cycle of the pulse is T.

Further, a 3-bit code is added between one 14-bit code and another separately from them. The value of this code is selected for every interval of 14-bit codes so that the probability of "1" or "0" arising in the created pulse train becomes 50%. Accordingly, the electric signal obtained by reading the information on the optical disc modulated by the EFM modulation method ideally becomes constant in temporal mean value.

In the process referred to as "mastering" for converting an electric signal to pits to prepare a master of an optical disc, light such as a laser beam modulated in accordance with the electric signal is focused on to a photosensitive substance such as a photoresist uniformly coated on for example a polished glass plate, then this is developed to prepare a metal mask forming the master by using the uneven surface of the photoresist formed by the focusing of the light. The pits prepared at this time finely change in shape and size according to various conditions such as the power of the laser used for the mastering and the development time. For example, according to the various conditions, the lengths of the pits change so become slightly longer or shorter by substantially the same amounts even among pits having different lengths.

Such fluctuation of the length of the pits becomes the fluctuation of the pulse width of the electric signal read from the optical disc as it is, therefore the temporal mean value of the electric signal, which ideally should become constant as mentioned above, will fluctuate relative to the ideal value. The phenomenon of the temporal mean value of the read electric signal deviating according to the variance in the lengths of the pits in this way is referred to as "asymmetry".

The RF signal directly output from an optical signal reading unit (optical pickup) of the optical disc is not a rectangular wave, but a waveform resembling a sine wave. In order to process this as a digital signal, this sine wave-shaped signal must be converted to a binary pulse signal. However, when the asymmetry of the read signal becomes large, in the process of converting the sine wave-shaped RF signal to a binary pulse signal, the threshold value for the binary coding fluctuates, so erroneous binary coding results and the inconvenience that the error rate of the data is increased occurs.

In order to avoid such an inconvenience, conventionally a waveform reforming circuit as shown in FIG. 1 has been used.

FIG. 1 is a circuit diagram of a conventional waveform reforming circuit for correction of asymmetry.

In FIG. 1, 10 denotes a comparator, 11 a DC bias circuit, 20 a smoothing circuit, 40 a voltage amplifier, R11, R12, R21, R22, and R41 to R43 denote resistors, C11, C21, and C22 denote capacitors, U3 and U4 denote inversion gates, and U40 denotes an operation amplifier. Further, VDD denotes a power supply voltage of the circuit.

The DC bias circuit eliminates the DC component from the RF signal output from the optical pickup, gives a DC bias voltage of a half of the power supply voltage (VDD/2), and outputs the same to the comparator 10.

Specifically, one terminal of the capacitor C11 receives the RP signal output from the optical pickup, while the other terminal of the capacitor C11 is connected to a node of the resistor R11 and the resistor R12 having equal resistance values cascade connected between the power supply voltage and a ground potential. The RF signal is output from this node to the comparator 10.

The comparator 10 compares the RF signal output from the DC bias circuit 10 and the threshold voltage output from the voltage amplifier 40 and outputs an output signal CDATA binary coded to a high level equal to the power supply voltage and a low level equal to the ground potential.

The smoothing circuit 20 receives the output signal CDATA via the cascade connected inversion gates U3 and U4 and outputs the temporal mean value smoothing the output signal CDATA to the voltage amplifier circuit 40.

The voltage amplifier 40 amplifies a difference voltage between the temporal mean value of the output signal CDATA received from the smoothing circuit 20 and the DC bias voltage (VDD/2) and outputs the amplified difference voltage to the comparator 10 as the threshold voltage for the binary coding.

Specifically, a positive side input terminal of the operation amplifier U40 receives the temporal mean value of the output signal CDATA from the smoothing circuit 20, while a negative side input terminal of the operation amplifier U40 is connected to the node of the resistor R41 and the resistor R42 having equal resistance values cascade connected between the power supply voltage and the ground potential. The output voltage of the operation amplifier U40 is fed back via the resistor R43 to the negative side input terminal of the operation amplifier U40 and, at the same time, output to the comparator 10.

Next, an explanation will be made of the operation of the conventional waveform reforming circuit having the above configuration.

The RF signal input from a not illustrated optical pickup circuit to the DC bias circuit 11 is cleared of its DC component by the capacitor C11 and, at the same time, given the DC bias voltage (VDD/2) at the node of the resistor R11 and the resistor R12 and output to the comparator 10.

FIG. 2 is a view of the waveforms of the RF signal in the input and output of the DC bias circuit 11.

In FIG. 2, A denotes the voltage waveform of the RF signal in the input of the DC bias circuit, B denotes the temporal mean value of the voltage waveform A, C denotes the voltage waveform of the RF signal in the output of the DC bias circuit, and D denotes the temporal mean value of the voltage waveform C. Further, the broken lines in the figure represent the temporal mean values in an ideal state free from asymmetry.

As shown in FIG. 2, when a fluctuation of "a" occurs in the temporal mean value of the input RF signal due to the asymmetry, the ideal value of the temporal mean value of the RF signal in the output of the DC bias circuit 11 causes a fluctuation of "a" relative to the DC bias voltage (VDD/2). Accordingly, when this RF signal is binary coded with the DC bias voltage (VDD/2) as the threshold value, the margin with respect to the high level signal becomes smaller by exactly "a" in the example of FIG. 2, therefore the probability of erroneously binary coding the high level signal to a low level becomes high.

In the circuit shown in FIG. 1, by controlling the threshold value when binary coding the RF signal output from the DC bias circuit 11, the increase of the error rate due to failure of the binary coding mentioned above is reduced.

Specifically, the RF signal output from the DC bias circuit 11 is compared with the threshold voltage output by the voltage amplifier 40 at the comparator 10 and is converted to a high level signal and output when the magnitude of the related RF signal is larger than the threshold voltage, while it is converted to a low level signal and output when the magnitude of the related RF signal is smaller than the threshold voltage. In this way, the RF signal is converted to a signal binary coded to the high level and low level.

The output signal of the comparator 10 binary coded to the high level and low level is input to the smoothing circuit 20 via the inversion gates U3 and U4. The inversion gates U3 and U4 are circuits for driving the smoothing circuit 20 with a low output impedance. It is also possible to make the comparator 10 directly drive them.

The binary signal input to the smoothing circuit 20 is smoothed to the DC voltage having the temporal mean value of the binary signal by two low pass type filters comprising the resistor R21 and the capacitor C21, and the resistor R22 and the capacitor C22. In the example of FIG. 1, the smoothing circuit 20 is configured by two low pass type filters constituted by resistors and capacitors, but the smoothing circuit 20 can also be configured by other low pass type filters capable of outputting the temporal mean value of the binary signal output by the comparator 10.

The temporal mean value of the binary signal output by the smoothing circuit 20 is compared with the DC bias voltage (VDD/2) by the voltage amplifier 40, and the difference voltage thereof is amplified and output as the threshold voltage to the comparator 10. Specifically, the temporal mean value of the binary signal obtained by the smoothing circuit 20 is input to the positive side input terminal of the operation amplifier U40. The output voltage of the operation amplifier U40 fluctuates in a direction canceling out the difference voltage between the negative side input terminal and the positive side input terminal of the operation amplifier U40 given the DC bias voltage (VDD/2), whereby the difference voltage between the temporal mean value of the binary signal and the DC bias voltage (VDD/2) is created at the output of the operation amplifier U40 and output to the comparator 10.

For example, when the probability of the high level output increases in the binary signal output by the comparator 10, the magnitude of the temporal mean value obtained by the output of the smoothing circuit 20 becomes larger than the DC bias voltage (VDD/2). By this, the voltage output by the voltage amplifier 40 becomes large. Accordingly, the threshold voltage to be compared with the RF signal at the comparator 10 becomes high, so the probability of the high level output at the comparator is controlled so as to decrease. Conversely, when the probability of the high level output is lowered in the binary signal output by the comparator 10, the magnitude of the temporal mean value obtained by the output of the smoothing circuit 20 becomes smaller than the DC bias voltage (VDD/2). Due to this, the voltage output by the voltage amplifier 40 also becomes small. Accordingly, the threshold voltage to be compared with the RF signal at the comparator 10 becomes low, so the probability of the high level output at the comparator 10 is controlled so as to increase.

In this way, even in a case where asymmetry occurs in the input RF signal, by controlling the threshold value for the binary coding so that the temporal mean value of the output signal becomes constant, the increase of the error rate of the data is prevented.

However, in the conventional waveform reforming circuit shown in FIG. 1, the threshold voltage is created by amplifying the difference between the temporal mean value of the binary signal output by the comparator 10 and the predetermined DC bias voltage (VDD/2) by the voltage amplifier 40, so the asymmetry in accordance with the amplification rate of the difference voltage by the voltage amplifier 40 will remain.

For example, when the temporal mean value of the binary signal output by the comparator 10 has become a voltage lower than the predetermined DC bias voltage (VDD/2) by exactly "a", the threshold voltage becomes lower than the predetermined DC bias voltage (VDD/2) by exactly a voltage such as G*a(VDD/2−G*a), if the amplification rate of the difference voltage of the voltage amplifier 40 is defined as G.

Here, when assuming that the RF signal by the output of the DC bias circuit 11 has become lower than the predetermined DC bias voltage (VDD/2) by exactly a voltage such as G*a+a, the RF signal obtained by the output of the DC bias circuit 11 becomes a voltage lower than the threshold voltage by exactly "a", therefore it is considered that a difference arises in the probabilities of occurrence of high level and low level voltages in the output of the comparator and that the probability of occurrence of the high level voltage is lowered. When assuming that the temporal mean value of the binary signal obtained by the comparator 10 becomes a voltage lower than the predetermined DC bias voltage (VDD/2) by exactly "a" due to the reduction of the probability of occurrence of a high level, the system of negative feedback in the waveform reforming circuit shown in FIG. 1 is stabilized in this state. Accordingly, the difference voltage "a" will remain in the temporal mean value of the binary signal by the comparator 10. This means that the probabilities of occurrence of the high level and low level in the binary signal do not become equal. Namely, there is the problem in that the difference of the data due to the failure of the binary coding is in principle included in the signal output by the above conventional waveform reforming circuit for correcting asymmetry.

Further, when the above relationship is applied to a case where the RF signal obtained by the output of the DC bias circuit 11 has a difference from the predetermined DC bias voltage (VDD/2) of exactly a voltage such as A, it is estimated that the temporal mean value of the binary signal obtained by the comparator 10 has a difference of magnitude proportional to a voltage such as A/(G+1) relative to the predetermined DC bias voltage (VDD/2). Namely, when the asymmetry of input increases, there is the problem in that the asymmetry of the binary signal output by the waveform reforming circuit also increases along with that.

According to the above explanation, if the amplification rate G of the difference voltage of the voltage amplifier is increased, the asymmetry of the binary signal output by the waveform reforming circuit will be lowered in reverse proportion to that. However, the difference caused by the offset voltage etc. of the operation amplifier U40 and the difference due to variation of the resistance values cannot be eliminated even by increasing the amplification rate G. Further, there also exists a problem that the increase of the amplification rate G enlarges the asymmetry by increasing the difference due to such manufacturing variations. Therefore, the amplification rate G can not be enlarged infinitely, so there is a limit in the asymmetry which can be lowered by the conventional circuit shown in FIG. 1.

SUMMARY OF THE INVENTION

An object of the present invention is to provide a waveform reforming circuit capable of outputting a binary signal for holding a predetermined temporal mean value in spite of fluctuation of the temporal mean value of an input signal.

To attain the above object, according to the present invention, there is provided a waveform reforming circuit provided with a signal comparison circuit for comparing magnitudes of an input signal and a comparison signal and creating an output signal having a first level when the input signal is larger than the comparison signal and having a second level when the input signal is smaller than the comparison signal, a difference detection circuit for comparing a temporal mean value of the output signal and a predetermined temporal mean value upon receipt of the output signal and outputting a difference signal having a magnitude in accordance with a difference between the temporal mean value of the output signal and the predetermined temporal mean value, and an integration circuit for outputting the comparison signal increasing or decreasing in accordance with a temporal integrated value of the difference signal upon receipt of the difference signal.

Preferably, the difference detection circuit includes a first current source for outputting a current increasing the comparison signal as the difference signal and a second current source for outputting a current decreasing the comparison signal as the difference signal, and the integration circuit includes a capacitor for outputting a charged voltage as the comparison signal to the signal comparison circuit upon receipt of the difference signal obtained by the first current source and the second current source.

Preferably, the first current source includes a first voltage source for outputting a first voltage and a first current controlling means for outputting a current in accordance with the difference between the first voltage and the temporal mean value of the output signal as the difference signal, the second current source includes a second voltage source for outputting a second voltage and a second current controlling means for outputting a current in accordance with the difference between the second voltage and the temporal mean value of the output signal as the difference signal, and the first current controlling means and the second current controlling means output either current as the difference signal in accordance with the level of the output signal.

Preferably, the first voltage source includes a third current controlling means for outputting a current in accordance with the difference between the first voltage and the predetermined temporal mean value and a first current control type voltage source receiving the current output by the third current controlling means and outputting a voltage controlled so that the related current holds a predetermined magnitude as the first voltage, and the second voltage source includes a fourth current controlling means for outputting a current in accordance with the difference between the second voltage and the predetermined temporal mean value and a second current control type voltage source receiving the current output by the fourth current controlling means and outputting a voltage controlled so that the related current holds the predetermined magnitude as the first voltage.

According to the present invention, the input signal input to the signal comparison circuit is compared with the comparison signal by the integration circuit, converted to the output signal having the first level when the input signal is larger than the comparison signal, converted to the output signal having the second level when the input signal is smaller than the comparison signal, and output from the signal comparison circuit.

The difference of the temporal mean value of the output signal input to the difference detection circuit from the predetermined temporal mean value is detected, converted to the difference signal having a magnitude in accordance with the related difference, and output to the integration circuit.

The difference signal input to the integration circuit is integrated in time in the integration circuit, converted to the comparison signal increasing or decreasing in accordance with the integrated value, and output to the signal comparison circuit.

According to the present invention, the difference signal is output from the first current source to the integration circuit as the current increasing the comparison signal and, at the same time, output from the second current source to the integration circuit as the current decreasing the comparison signal.

The integration circuit has the capacitor, charged or discharged by the currents by the first current source and the second current source, and outputs the charged voltage as the comparison signal to the signal comparison circuit.

According to the present invention, the difference of the temporal mean value of the output signal from the first voltage is detected at the first current controlling means, converted to the difference signal as the current having a magnitude in accordance with the related difference, and output to the capacitor. Further, the difference of the temporal mean value of the output signal from the second voltage is detected at the second current controlling means, converted to the difference signal as the current having a magnitude in accordance with the related difference, and output to the capacitor.

The current in accordance with the difference between the first voltage and the predetermined temporal mean value is output from the third current controlling means to the first current control type voltage source. The first current control type voltage source receiving the related current outputs the first voltage controlled so that the related current becomes a predetermined current.

Further, the current in accordance with the difference between the second voltage and the predetermined temporal mean value is output from the fourth current controlling means to the second current control type voltage source, and the second current control type voltage source receiving the related current outputs the second voltage controlled so that the related current becomes the predetermined current.

BRIEF DESCRIPTION OF THE DRAWINGS

The above object and features of the present invention will be more apparent from the following description of the preferred embodiments given with reference to the accompanying drawings, wherein:

FIG. 6 is a graph comparing asymmetry rates of output signals of the conventional waveform reforming circuit and the waveform reforming circuit according to the present invention.

DESCRIPTION OF THE PREFERRED EMBODIMENTS

Figure 3:
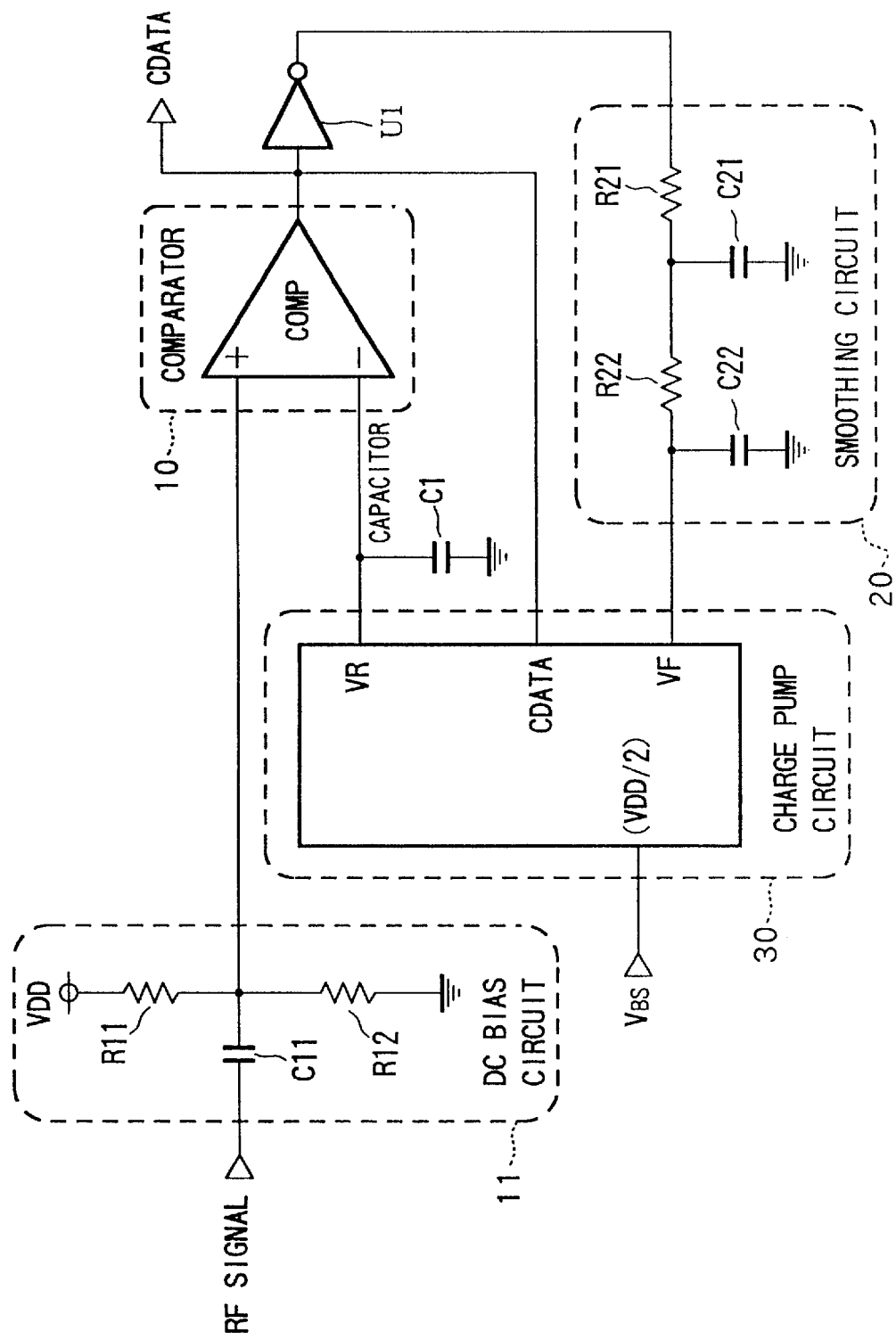
FIG. 3 is a circuit diagram of an embodiment of a waveform reforming circuit according to the present invention.

FIG. 3 is a circuit diagram of an embodiment of a waveform reforming circuit according to the present invention.

In FIG. 3, 10 denotes a comparator, 11 denotes a DC bias circuit, 20 a smoothing circuit, 30 a charge pump circuit, R11, R12, R21, and R22 resistors, C11, C21, and C22 capacitors, and U1 an inversion gate. Further, VDD indicates the power supply voltage of the circuit.

The DC bias circuit eliminates the DC component from the RF signal output from the optical pickup, gives a DC bias voltage of a half of the power supply voltage (VDD/2), and outputs the same to the comparator 10.

Specifically, one terminal of the capacitor C11 receives the RF signal output from the optical pickup, while the other terminal of the capacitor C11 is connected to connection the node of the resistor R11 and the resistor R12 having equal resistance values cascade connected between the power supply voltage and the ground potential. The RF signal is output from this node to the comparator 10.

The comparator 10 compares the RF signal output from the DC bias circuit 10 and the threshold voltage obtained by the charge voltage of the capacitor C1 and outputs the output signal CDATA binary coded to a high level equal to the power supply voltage and a low level equal to the ground potential.

The smoothing circuit 20 receives the output signal CDATA via the inversion gate U1 and outputs the temporal mean value obtained by smoothing the output signal CDATA to the charge pump circuit 30.

The charge pump circuit 30 outputs the current in accordance with the difference voltage between the temporal mean value of the output signal CDATA received from the smoothing circuit 20 and the DC bias voltage (VDD/2) to the capacitor C1.

Figure 4:
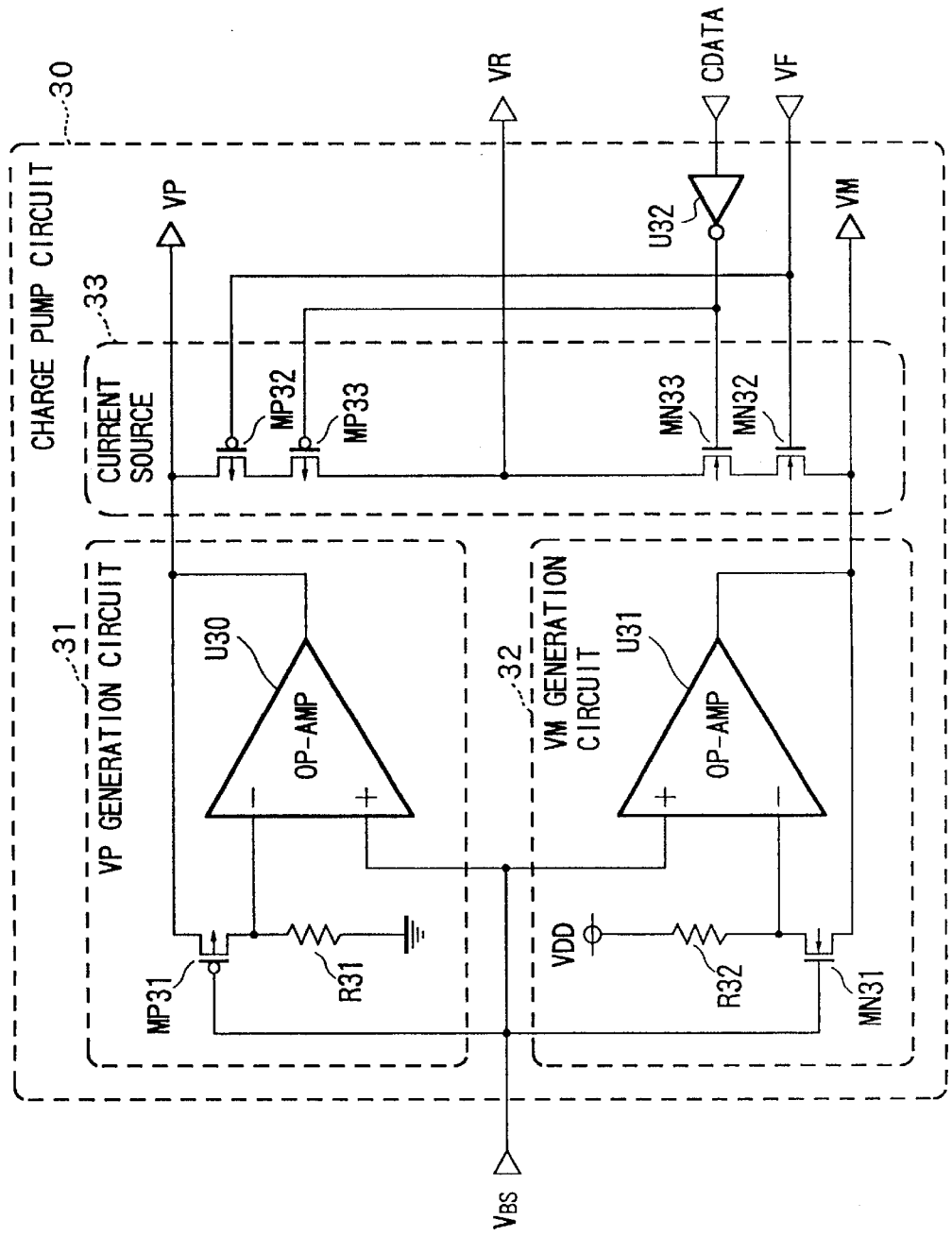
FIG. 4 is a circuit diagram of a charge pump circuit in the waveform reforming circuit of the present invention.

This charge pump circuit 30 specifically has a circuit diagram shown in FIG. 4.

FIG. 4 is a circuit diagram showing the charge pump circuit 30 in the waveform reforming circuit of the present invention. In FIG. 4, 31 denotes a VP generation circuit, 32 denotes a VM generation circuit, R31 and R32 denote resistors, MN31 to MN33 denote n-channel type MOS transistors, MP31 to MP33 denote p-channel type MOS transistors, U30 and U31 denote operation amplifiers, and U32 denotes the inversion gate. Further, VP, VM, VR, VF, VBS, and CDATA denote nodes of the circuits.

The node CDATA is connected via the inversion gate U1 to the output of the comparator 10, the node VF is connected to the output of the smoothing circuit 20, and the node VR is connected to the capacitor C1 and the comparator 10. Further, a voltage equal to the DC voltage VDD/2 is supplied to the node VBS.

The p-channel type MOS transistors MP32 and MP33 are cascade connected between the node VP and the node VR, the source of the p-channel type MOS transistor MP32 is connected to the node VP, and the drain of the p-channel type MOS transistor MP33 is connected to the node VR.

Further, the gate of the p-channel type MOS transistor MP32 is connected to the node VF, and the gate of the p-channel type MOS transistor MP33 is connected via an inversion buffer U32 to the node CDATA.

The n-channel type MOS transistors MN32 and MN33 are cascade connected between the node VM and the node VR, the source of the n-channel type MOS transistor MN32 is connected to the node VM, and the drain of the n-channel type MOS transistor MN33 is connected to the node VR.

Further, the gate of the n-channel type MOS transistor MN32 is connected to the node VF, and the gate of the n-channel type MOS transistor MN33 is connected via an inversion buffer U32 to the node CDATA.

The source of the p-channel type MOS transistor MP31 is connected to the node VP, and the drain is connected via the resistor R31 to the ground potential. The negative side input terminal of the operation amplifier U30 is connected to a node between the drain of the p-channel type MOS transistor MP31 and the resistor R31, and the positive side input terminal is connected to the node VBS. The output of the operation amplifier U30 is connected to the node VP.

The source of the n-channel type MOS transistor MN31 is connected to the node VM, and the drain is connected to the power supply VDD via the resistor R32 having a resistance value equal to that of the resistor R31. The negative side input terminal of the operation amplifier U31 is connected to a node between the n-channel type MOS transistor MN31 and the resistor R32, and the positive side input terminal is connected to the node VBS. The output of the operation amplifier U31 is connected to the node VM.

The capacitor C1 is charged or discharged by the current output by the node VR of the charge pump circuit, and the charged voltage is output to the comparator 10.

Next, an explanation will be made of the operation of the waveform reforming circuit of the present invention having the above configuration.

Figure 1:
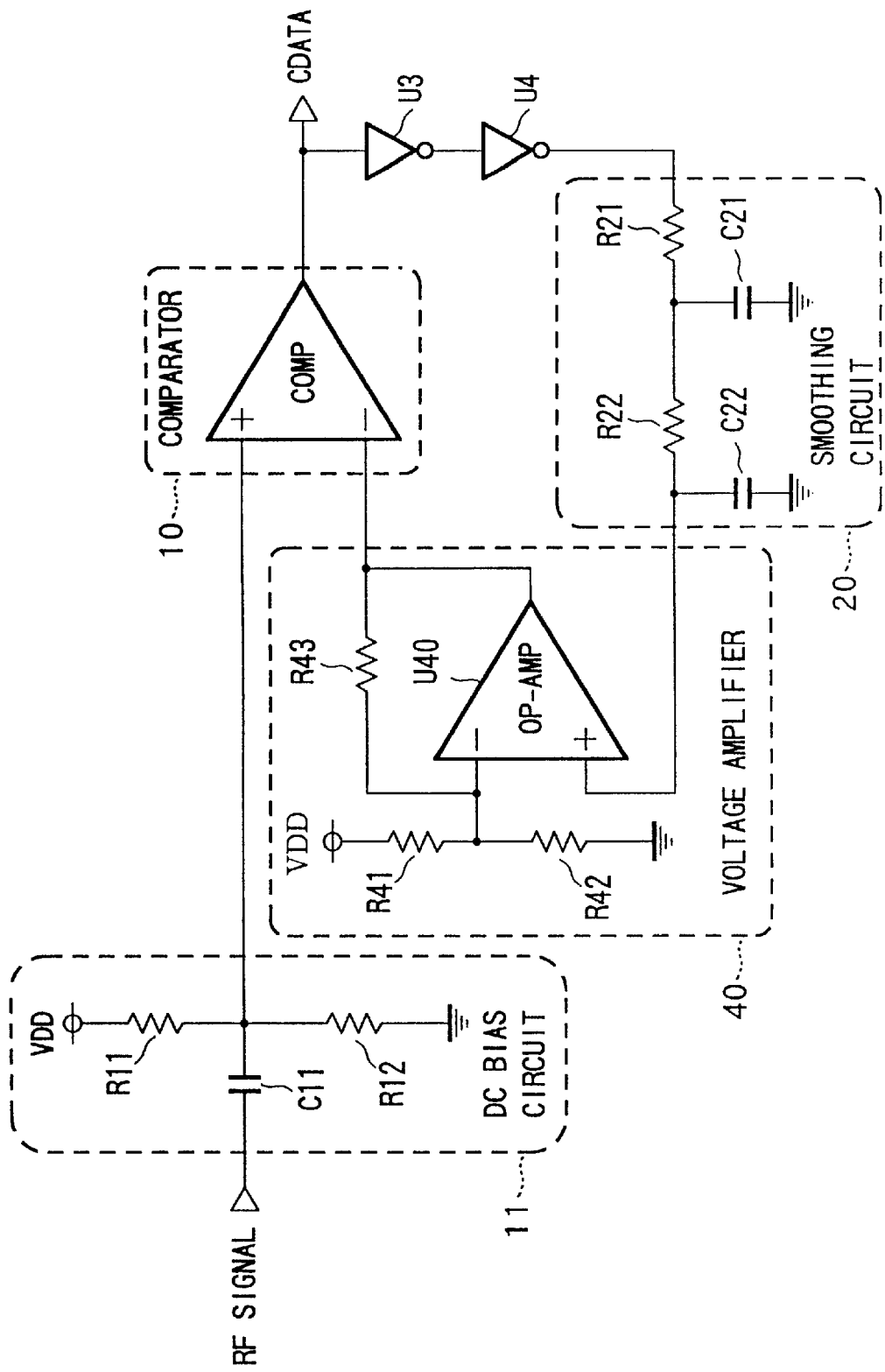
FIG. 1 is a circuit diagram of a conventional waveform reforming circuit for correcting asymmetry.
Figure 2:
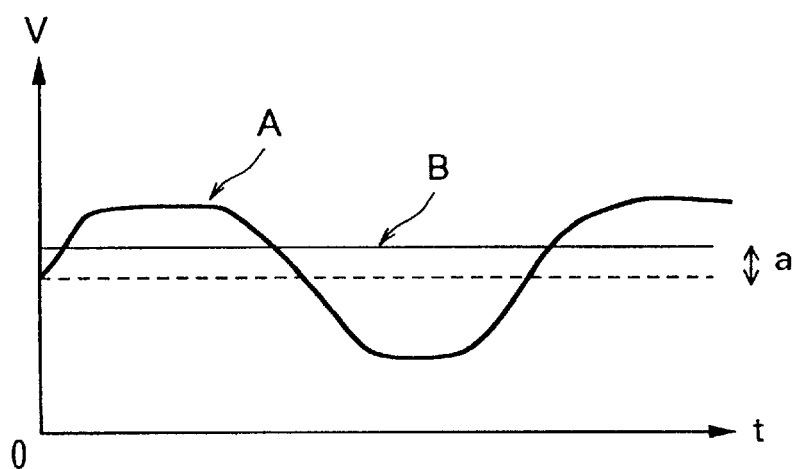
FIG. 2 is a view of waveforms of an RF signal in an input and an output of a DC bias circuit.
Figure 2:
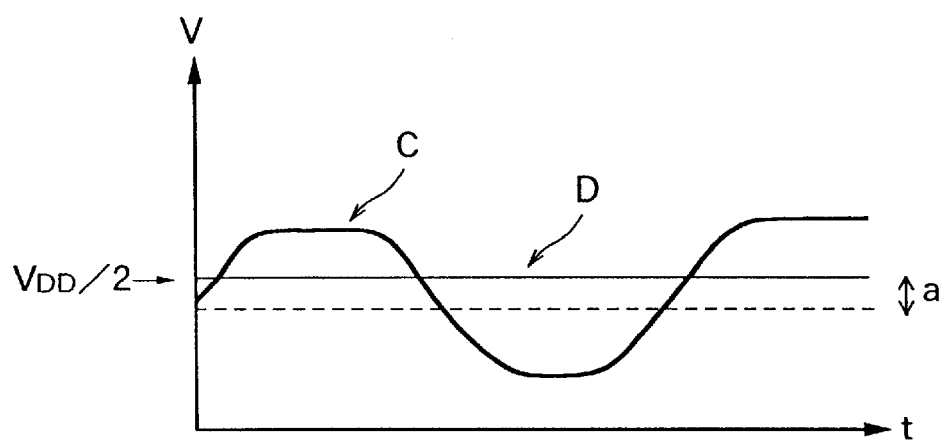

Note that, the DC bias circuit 11 is identical to that explained in the conventional waveform reforming circuit shown in FIG. 1, so the explanation of the operation is omitted.

The RF signal output from the DC bias circuit 11 is compared with the threshold voltage by the charged voltage of the capacitor C1 at the comparator 10, converted to a high level signal and output when the magnitude of the related RF signal is larger than the threshold voltage, and converted to a low level signal and output when the magnitude of the related RF signal is smaller than the threshold voltage. In this way, the RF signal is converted to a signal binary coded to a high level and low level.

The output signal of the comparator 10 binary coded to the high level and low level is input via the inversion gate U1 to the smoothing circuit 20. The inversion gate U1 drives the smoothing circuit 20 with a low output impedance and, at the same time, functions to invert the phase of the feedback signal in order to control the negative feedback to bring the temporal mean value of the output signal close to the predetermined DC bias voltage (VDD/2).

The binary signal input to the smoothing circuit 20 is smoothed to a DC voltage having the temporal mean value of the binary signal by two low pass type filters comprising the resistor R21 and capacitor C21 and the resistor R22 and capacitor C22. In the example of FIG. 3, the smoothing circuit 20 is configured by two low pass type filters comprising resistors and capacitors, but the smoothing circuit 20 can also be configured by other low pass type filters capable of outputting the temporal mean value of the binary output signal of the comparator 10.

The temporal mean value of the binary signal output from the smoothing circuit 20 is compared with the DC bias voltage (VDD/2) by the charge pump circuit 30, and the current corresponding to the difference voltage thereof is output to the capacitor C1.

Here, the operation of the charge pump circuit 30 will be explained in detail.

The p-channel type MOS transistor MP33 operates as a switch. By receiving voltage via the inversion gate at its gate, a low level voltage is supplied to its gate when the output signal CDATA is at a high level and the transistor becomes ON. Further, the source of the p-channel type MOS transistor MP32 is held at a constant voltage by the VP generation circuit 31 mentioned later. Therefore, when the p-channel type MOS transistor MP33 is in the ON state, the current flows from the drain to the node VR in accordance with the voltage of the output VF of the smoothing circuit 20 applied to the gate.

Namely, the current source is configured by the VP generation circuit 31 and the p-channel type MOS transistors MP32 and MP33. When the output signal CDATA is at a high level, the current obtained by the related current source controlled by the output VF of the smoothing circuit 20 is output from the node VR to the capacitor C1. The capacitor C1 is charged by this current.

The n-channel type MOS transistor MN33 operates as a switch. By receiving voltage via the inversion gate at its gate, a high level voltage is applied to its gate when the output signal CDATA is at a low level and the transistor becomes ON. Further, the n-channel type MOS transistor MN32 is held at a constant voltage at its source by the VM generation circuit 32 mentioned later. Therefore, when the n-channel type MOS transistor MN33 is in the ON state, the current flows from the node VR to the drain in accordance with the voltage of the output VF of the smoothing circuit 20 applied to the gate.

Namely, the current source is configured by the VM generation circuit 32 and the n-channel type MOS transistors MM32 and MN33. When the output signal CDATA is at a low level, the current obtained by the related current source controlled by the output VF of the smoothing circuit 20 is output from the node VR to the capacitor C1, and the capacitor C1 is discharged by this current.

The VP generation circuit 31 controls the voltage of the node VP so that the current flowing from the source to the drain of the p-channel type MOS transistor MP31 becomes the constant current determined according to the resistor R31 and the DC voltage VDD/2.

When specifically explaining this, the current passing through the source of the p-channel type MOS transistor MP32 and flowing to the drain from the output of the operation amplifier U30 flows via the resistor R31 to the ground potential. This current is converted to voltage by the resistor R31, input to the negative side input terminal of the operation amplifier U30, and compared with VDD/2 input to the positive side input terminal.

When the current flowing from the source to the drain of the p-channel type MOS transistor MP31 decreases and the drain voltage of the p-channel type MOS transistor MP31 becomes smaller than the DC voltage VDD/2, the voltage of the positive side input terminal becomes higher relative to the voltage of the negative side input terminal, so the output voltage of the operation amplifier U30 rises. The gate of the p-channel type MOS transistor MP31 is fixed at the DC voltage VDD/2, therefore, when the output voltage of the operation amplifier U30 rises, the voltage of the source with respect to the gate of the p-channel type MOS transistor MP31 becomes high. By this, the current flowing from the source to the drain of the p-channel type MOS transistor MP31 increases.

Conversely, when the current flowing from the source to the drain of the p-channel type MOS transistor MP31 increases and the drain voltage of the p-channel type MOS transistor MP31 becomes larger than the DC voltage VDD/2, the output voltage of the operation amplifier U30 is lowered. By this, the voltage of the source with respect to the gate of the p-channel type MOS transistor MP31 is lowered, so the current flowing from the source to the drain of the p-channel type MOS transistor MP31 decreases.

By the above operation, the voltage of the node VP is controlled so that the current flowing from the source to the drain of the p-channel type MOS transistor MP31 becomes the constant current determined according to the resistor R31 and the DC voltage VDD/2.

The VM generation circuit 32 controls the voltage of the node VM so that the current flowing from the drain to the source of the n-channel type MOS transistor MN31 becomes the constant current determined according to the resistor R32 and the DC voltage VDD/2.

When specifically explaining this, the current flowing through the drain of the n-channel type MOS transistor MN31 from the power supply voltage VDD via the resistor R32 passes through the source of the n-channel type MOS transistor MN31 and flows to the output of the operation amplifier U31. This current is converted to voltage by the resistor R32 and input to the negative side input terminal of the operation amplifier U31 and compared with the VDD/2 input to the positive side input terminal.

When the current flowing from the drain to the source of the n-channel type MOS transistor MN31 increases and the drain voltage of the n-channel type MOS transistor MN31 becomes smaller than the DC voltage VDD/2, the voltage of the positive side input terminal becomes higher than the voltage of the negative side input terminal, so the output voltage of the operation amplifier U31 rises. The gate of the n-channel type MOS transistor MN31 is fixed at the DC voltage VDD/2. Therefore, when the output voltage of the operation amplifier U31 rises, the voltage of the gate with respect to the source of the n-channel type MOS transistor MN31 becomes low. Due to this, the current flowing form the drain to the source of the n-channel type MOS transistor MN31 decreases.

Conversely, when the current flowing from the drain to the source of the n-channel type MOS transistor MN31 decreases and the drain voltage of the n-channel type MOS transistor MN31 becomes larger than the DC voltage VDD/2, the output voltage of the operation amplifier U31 is lowered. By this, the voltage of the gate with respect to the source of the n-channel type MOS transistor MN31 becomes high, therefore the current flowing from the drain to the source of the n-channel type MOS transistor MN31 increases.

By the above operation, the voltage of the node VM is controlled so that the current flowing from the drain to the source of the n-channel type MOS transistor MN31 becomes the constant current determined according to the resistor R32 and the DC voltage VDD/2.

The p-channel type MOS transistor MP31 and the p-channel type MOS transistor MP32 are connected to the common node VP, and therefore, when the output voltage VF of the smoothing circuit 20 is equal to the DC voltage VDD/2, the voltage between the gate and source of the p-channel type MOS transistor MP32 becomes equal to the voltage between the gate and source of the p-channel type MOS transistor MP31. When assuming that the characteristics of the drain currents with respect to the gate voltages in the p-channel type MOS transistor MP31 and the p-channel type MOS transistor MP32 coincide, when the output voltage VF of the smoothing circuit 20 is equal to the DC voltage VDD/2, the current flowing from the source to the drain of the p-channel type MOS transistor MP32 becomes equal to the current flowing from the source to the drain of the p-channel type MOS transistor MP31.

Similarly, when assuming that the characteristics of the drain currents with respect to the gate voltages in the n-channel type MOS transistor MN31 and the n-channel type MOS transistor MN32 coincide, when the output voltage VF of the smoothing circuit 20 is equal to the DC voltage VDD/2, the current flowing from the drain to the source of the n-channel type MOS transistor MN32 becomes equal to the current flowing from the drain to the source of the n-channel type MOS transistor MN31.

Further, the resistor R31 and the resistor R32 have equal resistance values, therefore the current flowing from the source to the drain of the p-channel type MOS transistor MP31 and the current flowing from the drain to the source of the n-channel type MOS transistor MN31 are equal.

Accordingly, when the output voltage VF of the smoothing circuit 20 is equal to the DC voltage VDD/2, the currents flowing between the drains and the sources of the p-channel type MOS transistors MP32 and MP33 and the currents flowing between the drains and the sources of the n-channel type MOS transistors MN32 and MN33 become equal.

Next, an explanation will be made of the control of the temporal mean value of the binary output signal output by the comparator 10 so as to coincide with the voltage (VDD/2) of half of the power supply voltage by the operation of the units explained above by referring to the drawings.

Figure 5:
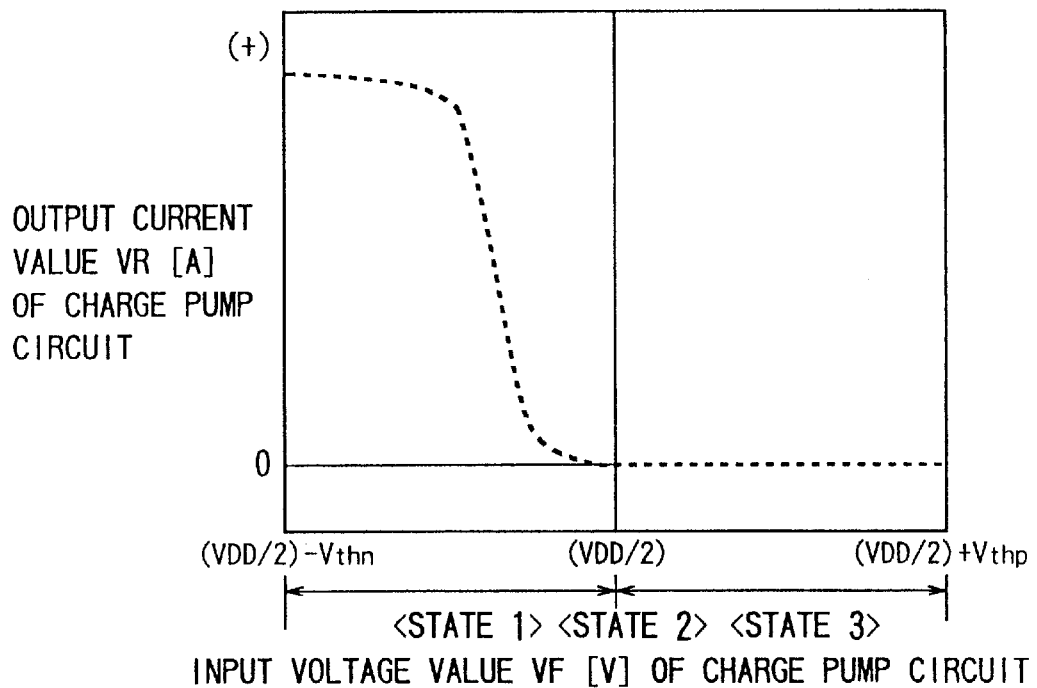
FIG. 5 is a graph of an output current with respect to an input voltage of the charge pump circuit.
Figure 5:
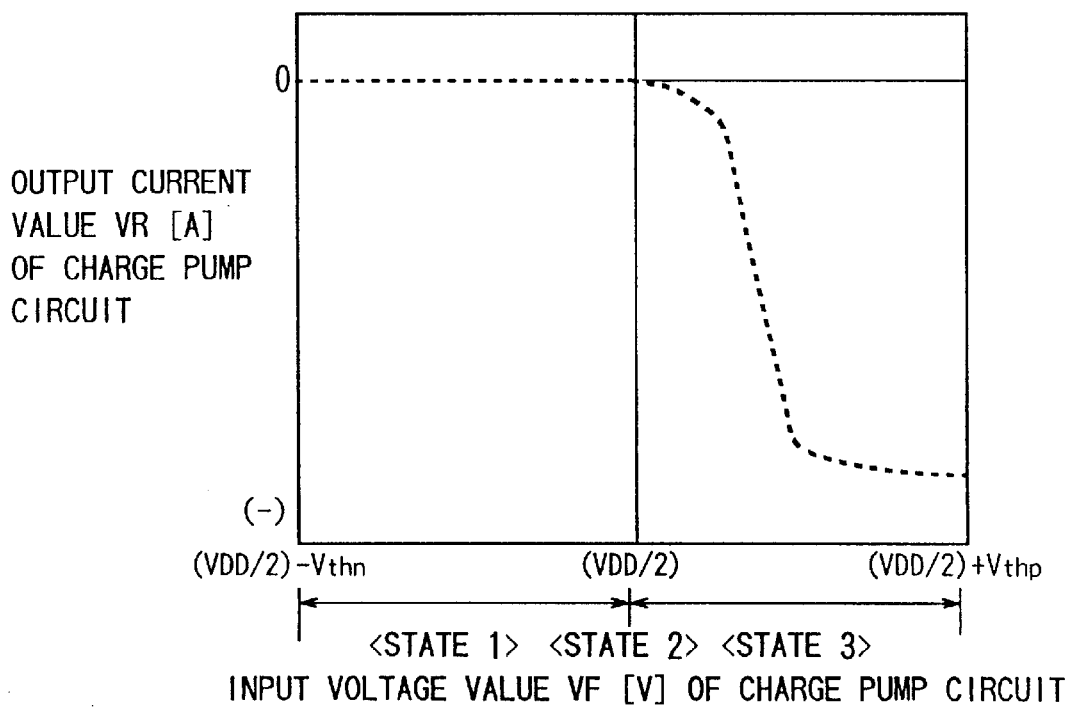

FIG. 5 is a graph of the current output from the node VR of the charge pump circuit 30 with respect to the voltage input to the node VF of the charge pump circuit 30. The abscissa represents the voltage of the node VF, and the ordinate represents the magnitude of the current wherein the direction of the flow from the node VR toward the capacitor C1 is defined as a positive polarity (+).

In FIG. 5, <STATE 1> to <STATE 3> represent three states classified according to the voltages of the node VF. The time when the voltage of the node VF is smaller than the voltage VDD/2 of half of the power supply voltage is indicated as <STATE 1>, the time when the voltage of the node VF is equal to the voltage VDD/2 is indicated as <STATE 2>, and the time when the voltage of the node VF is larger than the voltage VDD/2 is indicated as <STATE 3>.

Further, "Vthn" indicated in the abscissa represents the voltage between the gate and source of the n-channel type MOS transistor MN31 when the current flowing from the drain to the source of the n-channel type MOS transistor MN31 is controlled so as to become the constant current determined according to the resistor R32 and the DC voltage VDD/2, and "Vthp" represents the voltage between the gate and source of the p-channel type MOS transistor MP31 when the current flowing from the source to the drain of the p-channel type MOS transistor MP31 is controlled so as to become the constant current determined according to the resistor R31 and the DC voltage VDD/2.

Accordingly, in the normal state, the output voltage of the VP generation circuit 31 becomes VDD/2+Vthp, and the output voltage of the VM generation circuit 32 becomes VDD/2−Vthn. Further, the voltage of the node VF is within a voltage range smaller than VDD/2+Vthp but larger than VDD/2−Vthn.

In FIG. 5, <WHEN CDATA="1"> represents the time when the output signal of the comparator 10 is in the high level state. The graph of the upper side of FIG. 5 is the graph showing the current output from the node VR of the charge pump circuit 30 at this time.

Further, <WHEN CDATA="0"> represents the time when the output signal of the comparator 10 is in the low level state. The graph of the lower side of FIG. 5 is the graph showing the current output from the node VR of the charge pump circuit 30 at this time.

When the temporal mean value of the binary output signal CDATA output by the comparator 10 rises, the voltage of the output VF of the smoothing circuit 20 outputting the temporal mean value of the output signal CDATA inverted by the inversion gate U1 is lowered. Then, when the voltage of the node VF becomes <STATE 1> smaller than the DC voltage VDD/2, the p-channel type MOS transistor MP32 becomes the ON state, and the on resistance is lowered in accordance with the lowering of the voltage of the output VP of the smoothing circuit 20. Conversely, the on resistance of the n-channel type MOS transistor MN32 becomes high and the transistor turns OFF.

Whenever the output signal CDATA becomes the high level and the p-channel type MOS transistor MP33 turns ON, the current shown in the upper graph of FIG. 5 flows through the p-channel type MOS transistor MP32 and charges the capacitor C1. On the other hand, even if the output signal CDATA becomes the low level and the n-channel type MOS transistor MN33 turns ON, the n-channel type MOS transistor MN32 is in the OFF state, so the current discharging the capacitor C1 does not flow as shown in the lower graph of FIG. 5. Accordingly, the capacitor C1 is continuously charged by the current by the p-channel type MOS transistor MP32, so the voltage of the capacitor C1 rises at the time of <STATE 1>.

When the voltage of the capacitor C1 rises, the threshold voltage input to the comparator 10 rises, therefore the probability of occurrence of a high level signal in the output of the comparator 10 decreases. Due to this, the temporal mean value of the binary output signal CDATA output by the comparator 10 is lowered.

When the temporal mean value of the binary output signal CDATA output by the comparator 10 is lowered, the voltage of the output VF of the smoothing circuit 20 outputting the temporal mean value of the output signal CDATA inverted by the inversion gate U1 rises. Then, when the voltage of the node VF becomes <STATE 3> larger than the voltage VDD/2, the n-channel type MOS transistor MN32 becomes the ON state, and the on resistance is lowered in accordance with the rise of the voltage of the output VF of the smoothing circuit 20. Conversely, the on resistance of the p-channel type MOS transistor MP32 becomes high and the transistor turns OFF.

Whenever the output signal CDATA becomes the low level and the n-channel type MOS transistor MN33 turns ON, the current as shown in the lower graph of FIG. 5 flows through the n-channel type MOS transistor MN32 and discharges the capacitor C1. On the other hand, even if the output signal CDATA becomes the high level and the p-channel type MOS transistor MP33 turns ON, the p-channel type MOS transistor MP32 is in the OFF state, so the current charging the capacitor C1 does not flow as shown in the upper graph of FIG. 5. Accordingly, the capacitor C1 is continuously discharged by the current by the n-channel type MOS transistor MN32, so the voltage of the capacitor C1 is lowered at the time of <STATE 3>.

When the voltage of the capacitor C1 is lowered, the threshold voltage input to the comparator 10 is lowered, therefore the probability of occurrence of the low level signal in the output of the comparator 10 decreases. Due to this, the temporal mean value of the binary output signal CDATA output by the comparator 10 rises.

When the probabilities of occurrence of the high level and the low level of the binary output signal CDATA output by the comparator 10 coincide and become 50% and the temporal mean value of the output signal CDATA becomes equal to the voltage VDD/2 of a half of the power supply voltage, also the temporal mean value of the output signal CDATA inverted by the inversion gate U1 becomes equal to the voltage VDD/2, therefore the voltage of the output VF of the smoothing circuit 20 becomes <STATE 2> equal to VDD/2.

As already explained, when the voltage of the output VF of the smoothing circuit 20 is equal to VDD/2, the currents flowing between the drains and the sources of the p-channel type MOS transistors MP32 and MP33 and the currents flowing between the drains and the sources of the n-channel type MOS transistors MN32 and MN33 become equal. Namely, the magnitude of the current charging the capacitor C1 when both of the p-channel type MOS transistor MP32 and the n-channel type MOS transistor MN32 are in the ON state, the output signal CDATA becomes the high level, and the p-channel type MOS transistor MP33 turns ON and the magnitude of the current for discharging the capacitor C1 when the output signal CDATA becomes the low level and the n-channel type MOS transistor MN33 turns ON become equal.

In addition to that the magnitudes of the current charging the capacitor C1 and the current discharging the capacitor C2 being equal, the probabilities of occurrence of the high level and the low level of the output signal CDATA are 50%, therefore the charging time and the discharging time also become equal and therefore the temporal integrated value of the current flowing into the capacitor C1 becomes zero and the charge voltage of the capacitor C1 becomes constant. Since the voltage of the capacitor C1 is constant, the threshold voltage of the comparator 10 also becomes constant, and the probabilities of occurrence of the high level and the low level in the output signal CDATA of the comparator 10 do not change. Accordingly, at the time of <STATE 2>, the probabilities of occurrence of the high level and the low level in the output signal CDATA of the comparator 10 are held at 50%.

By such an operation, the voltage of the output VF of the smoothing circuit 20 is converged from <STATE 1> and <STATE 3> to <STATE 2>. Namely, the probabilities of occurrence of the high level and the low level in the output signal CDATA converge to 50%.

The charged voltage of the capacitor C1 of the waveform reforming circuit of the present invention rises or lowered unless the charging current and the discharging current cancel each other out and the temporal integrated value of the current flowing into the capacitor C1 becomes zero, therefore, if the negative feedback is stably controlled, the state of the waveform reforming circuit of the present invention is converged to <STATE 2> when the temporal integrated value of the current flowing into the capacitor C1 becomes zero. Then, this state does not fluctuate according to the magnitude of the asymmetry of the RF signal to be input.

Namely, the threshold value of the comparator 10 is not created by amplifying the difference from the reference value as in the conventional waveform reforming circuit shown in FIG. 1, but the threshold value is created by integrating the difference from the reference value, therefore an output signal having a constant temporal mean value not fluctuating according to the magnitude of the asymmetry of the input RF signal can be obtained.

FIG. 6 is a graph comparing the asymmetry rates of the output signals of the conventional waveform reforming circuit and the waveform reforming circuit according to the present invention.

In FIG. 6, the abscissa represents the asymmetry rate before the correction of the threshold value, while the ordinate represents the asymmetry rate after the correction of the threshold value. Here, the asymmetry rate is defined as follows.

$$\text{Asymmetry rate } (\%) = (TH - TL)/T$$

In the above equation, T indicates one cycle of the signal, TH indicates the period of high level in one cycle, and TL indicates the period of low level in one cycle. Accordingly, the asymmetry rate when the periods of high level and low level are equal becomes zero.

Note that, in the asymmetry rate shown in the graph of FIG. 6, the asymmetry rate of the input RF signal and the asymmetry rate by the waveform reforming circuit itself are added together.

In FIG. 6, the line with black dots shows the characteristic of the waveform reforming circuit of the present invention, while the line with the white dots and the line with the triangles show the characteristics of the conventional waveform reforming circuit shown in FIG. 1, respectively.

Further, the line with the white dots indicates a case where the ratio of resistance values of the resistors R41, R42, and R43 in FIG. 1 is 2:2:5, while the line with the triangles indicates a case where the ratio of resistance values of the resistors R41, R42, and R43 in FIG. 1 is 2:2:3.

According to FIG. 6, in the case of the conventional waveform reforming circuit shown in FIG. 1, when the asymmetry rate of the input RF signal and the asymmetry rate by the waveform reforming circuit itself increase, the asymmetry rate of the output signal increases along with that. Contrary to this, according to the waveform reforming circuit of the present invention, the asymmetry rate of the output signal can be made constant in spite of the asymmetry rate of the input RF signal and the asymmetry rate of the waveform reforming circuit per se.

Further, according to FIG. 6, in the case of the conventional waveform reforming circuit shown in FIG. 1, by making the ratio of the resistor R43 with respect to the resistors R41 and R42 high, that is, by making the difference amplification rate of the voltage amplifier 40 large, the asymmetry rate of the output signal is enhanced. However, the asymmetry rate of the output signal of the waveform reforming circuit of the present invention becomes +0.1% or less, so a signal having an excellent symmetry in comparison with the conventional waveform reforming circuit shown in FIG. 1 can be obtained.

In this way, according to the waveform reforming circuit of the present invention, the asymmetry can be corrected with a high precision without influence of the asymmetry of the input signal due to the manufacturing process of the optical disc such as the variation of the pit lengths and the asymmetry due to the manufacturing variation of the waveform reforming circuit per se, therefore the error rate of the data of an optical disc reproducing apparatus having the waveform reforming circuit of the present invention can be reduced. Further, the rate of occurrence of defects due to manufacturing variation of the waveform reforming circuit itself can be reduced in comparison with the conventional waveform reforming circuit, therefore the yield of the product can be improved.

While the invention has been described by reference to specific embodiments chosen for purposes of illustration, it should be apparent that numerous modifications could be made thereto by those skilled in the art without departing from the basic concept and scope of the invention.

What is claimed is:

1. A waveform reforming circuit comprising:
    a signal comparison circuit for comparing magnitudes of an input signal and a comparison signal and creating an output signal having a first level when said input signal is larger than said comparison signal and having a second level when said input signal is smaller than said comparison signal,
    a difference detection circuit for comparing a temporal mean value of said output signal and a predetermined temporal mean value upon receipt of said output signal and outputting a difference signal having a magnitude in accordance with a difference between the temporal mean value of said output signal and said predetermined temporal mean value, and
    an integration circuit for outputting said comparison signal increasing or decreasing in accordance with a temporal integrated value of said difference signal upon receipt of said difference signal.

2. A waveform reforming circuit as set forth in claim 1, wherein said difference detection circuit outputs said difference signal increasing or decreasing said comparison signal in accordance with the level of the output signal.

3. A waveform reforming circuit as set forth in claim 1, wherein said difference detection circuit includes:
    a first current source for outputting a current increasing said comparison signal as said difference signal and
    a second current source for outputting a current decreasing said comparison signal as said difference signal, and
    said integration circuit includes a capacitor for outputting a charged voltage as said comparison signal to said signal comparison circuit upon receipt of said difference signal obtained by said first current source and said second current source.

4. A waveform reforming circuit as set forth in claim 2, wherein said difference detection circuit includes:
    a first current source for outputting a current increasing said comparison signal as said difference signal and
    a second current source for outputting a current decreasing said comparison signal as said difference signal, and
    said integration circuit includes a capacitor for outputting a charged voltage as said comparison signal to said signal comparison circuit upon receipt of said difference signal obtained by said first current source and said second current source.

5. A waveform reforming circuit as set forth in claim 3, wherein:
    said first current source includes:
        a first voltage source for outputting a first voltage and
        a first current controlling means for outputting a current in accordance with the difference between said first voltage and the temporal mean value of said output signal as said difference signal and
    said second current source includes:
        a second voltage source for outputting a second voltage and
        a second current controlling means for outputting a current in accordance with the difference between said second voltage and the temporal mean value of said output signal as said difference signal.

6. A waveform reforming circuit as set forth in claim 4, wherein:
    said first current source includes:
        a first voltage source for outputting a first voltage and
        a first current controlling means for outputting a current in accordance with the difference between said first voltage and the temporal mean value of said output signal as said difference signal;
    said second current source includes:
        a second voltage source for outputting a second voltage and
        a second current controlling means for outputting a current in accordance with the difference between said second voltage and the temporal mean value of said output signal as said difference signal and said first current controlling means and said second current controlling means output either current as said difference signal in accordance with the level of said output signal; and
        said first current controlling means and said second current controlling means output either current as said difference signal in accordance with the level of said output signal.

7. A waveform reforming circuit as set forth in claim 5, wherein:
    said first voltage source includes:
        a third current controlling means for outputting a current in accordance with the difference between said first voltage and said predetermined temporal mean value and
        a first current control type voltage source receiving the current output by said third current controlling means and outputting a voltage controlled so that the related current holds a predetermined magnitude as said first voltage, and said second voltage source includes a fourth current controlling means for outputting a current in accordance with the difference between said second voltage and said predetermined temporal mean value and a second current control type voltage source receiving the current output by said fourth current controlling means and outputting a voltage controlled so that the related current holds the predetermined magnitude as said first voltage.

8. A waveform reforming circuit as set forth in claim 6, wherein:

said first voltage source includes:
  a third current controlling means for outputting a current in accordance with the difference between said first voltage and said predetermined temporal mean value and
  a first current control type voltage source receiving the current output by said third current controlling means and outputting a voltage controlled so that the related current holds a predetermined magnitude as said first voltage, and said second voltage source includes a fourth current controlling means for outputting a current in accordance with the difference between said second voltage and said predetermined temporal mean value and a second current control type voltage source receiving the current output by said fourth current controlling means and outputting a voltage controlled so that the related current holds the predetermined magnitude as said first voltage.

9. A waveform reforming circuit as set forth in claim 7, further comprising a DC bias circuit eliminating a DC component from said input signal, giving a DC bias of a magnitude equal to the predetermined temporal mean value, and outputting the resultant signal as the input signal to the signal comparison circuit.

10. A waveform reforming circuit as set forth in claim 8, further comprising a DC bias circuit eliminating a DC component from said input signal, giving a DC bias of a magnitude equal to the predetermined temporal mean value, and outputting the resultant signal as the input signal to the signal comparison circuit.

* * * * *